June 4, 1968  D. J. McCULLOCH  3,386,790
RECESSED TEMPLE HINGE MOUNTING FOR SPECTACLE FRAME
Filed March 23, 1964

DONALD J. McCULLOCH
INVENTOR.

BY *Frank C. Parker*

ATTORNEY

United States Patent Office 3,386,790
Patented June 4, 1968

3,386,790
RECESSED TEMPLE HINGE MOUNTING FOR SPECTACLE FRAME
Donald J. McCulloch, Greece, N.Y., assignor to Bausch & Lomb Incorporated, Rochester, N.Y., a corporation of New York
Filed Mar. 23, 1964, Ser. No. 354,001
1 Claim. (Cl. 351—153)

ABSTRACT OF THE DISCLOSURE

Means for retaining a spectacle hinge member within a recess in a spectacle frame comprising an undercut around a portion of the periphery of the recess with the hinge member disposed in the recess with a flange seated in the undercut and a filler member seated in the recess to retain the hinge member locked therein.

The present invention relates to spectacle frames and more particularly to so-called blind hinge fastenings for plastic or Zylonite spectacle frame fronts.

The principal object of the present invention is to provide an improved hinge fastening for a plastic spectacle frame front wherein the use of rivets or other fastening means exposed to the front surface of the frame is obviated.

More particularly, is is an object of the present invention to provide a blind spectacle hinge fastening comprising two parts, one of which is formed with a peripheral flange adapted to be seated within an undercut recess formed in the rear side of the spectacle front and the other part being seated in the recess and in contact with the first part in order to lock the flange in the undercut to thereby retain the hinge in assembly with the spectacle front.

The invention will be more readily understood from the following detailed description when read in conjunction with the accompanying drawings, wherein.

Figure 1:
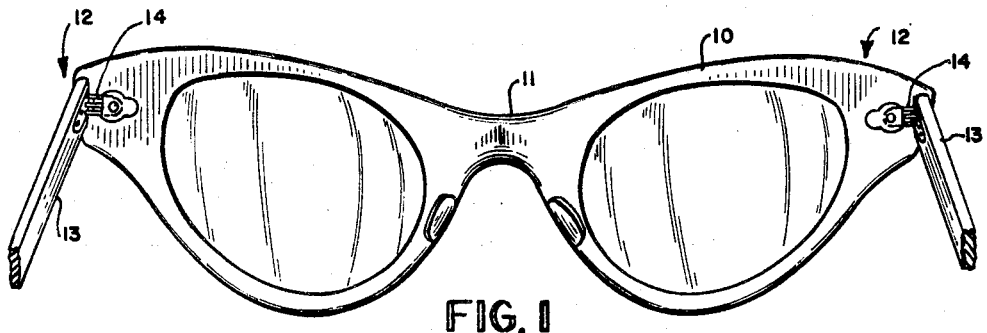
FIG. 1 is a perspective view of a spectacle frame having the temples secured to the front by blind fastening means as disclosed herein.
Figure 2:
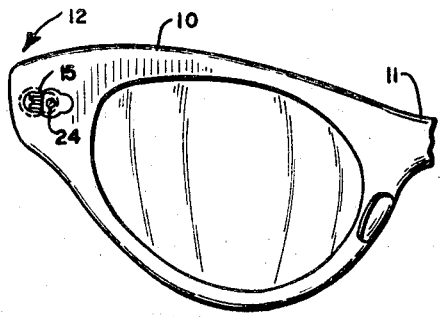
FIG. 2 is an enlarged fragmentary view of a single spectacle front lens rim having a hinge fastening of the type comprising the subject matter of the present invention.

With reference now to the drawing wherein like reference numerals are used to identify identical parts, the invention is applicable to a pair of spectacles made of plastic or Zylonite. The spectacle frame comprises a pair of lens rims 10 joined together by an integral bridge 11 and having temporal regions 12 whereat a pair of temples 13 are respectively hingedly connected. The temples 13 are only shown fragmentarily, it being understood that the temples 13 extend rearwardly from the spectacle front and are adapted to rest on the ears of the persons wearing the spectacles.

The hinge connections between the temples 13 and front comprise hinges 14. The hinges 14 are respectively connected to the temple ends in the usual manner and to the temporal region 12 in the improved manner disclosed herein. The portion of the hinge 14 connected to the temporal region 12 comprises a hinge member 15 and a filler member 16.

Figure 4:
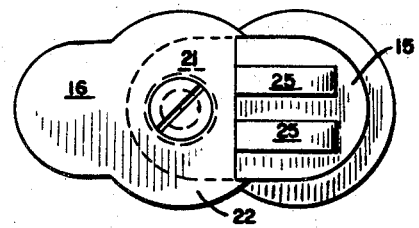
FIG. 4 is a plan view of the hinge member and filler member comprising the subject matter of the present invention.
Figure 3:
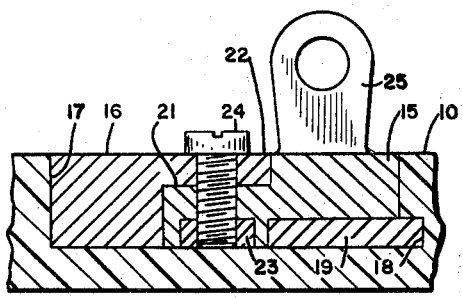
FIG. 3 is a fragmentary sectional view of the hinge fastening of the present invention.
Figure 5:
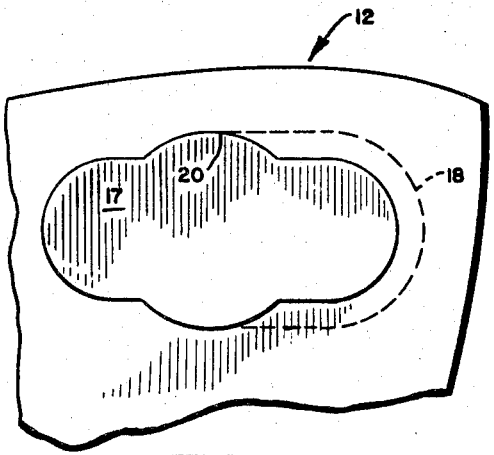
FIG. 5 is a fragmentary view disclosing the recess in the temporal portion of the spectacle front for receiving the blind hinge fastening of the present invention.

Each temporal region 12 is recessed, as indicated in FIGS. 3 and 5 by reference numeral 17. The planar configuration of the recess 17 is as shown in FIG. 5, the recess 17 being undercut, as indicated at 18, around the periphery at one end of the recess 17. The hinge member 15 is most clearly shown in FIGS. 3 and 4 and is formed with an oval configuration and a flange 19 substantially complementary in shape to the enlarged portion 20 of the recess 17. The hinge member 15 is also formed with a land portion 21 substantially parallel with the bottom of the hinge portion. The filler member 16 is formed with an overhanging flange 22 adapted to seat on land 21 and to mate with or abut the hinge member 15. The land portion 21 is bored to provide a recess for a nut 23 and the filler member 16 and land portion 21 are each bored to receive a small screw 24 which threads into the nut 23. The hinge member 15 is provided with the conventional barrel elements 25 by means of which the half of the hinge 14 which is connected to the temple 13 is pivotally connected to hinge member 15.

In assembling the hinge member 15 and filler member 16 within recess 17, the hinge member 15 is dropped into the left end of the recess 17, as viewed in FIG. 5, and then moved to the right until the flange 19 becomes seated within the undercut 18. The filler member 16 is then dropped into the recess in order to fill up the remaining space therein, the filler member 16 being complementary to hinge member 15. The screw 24 is then threaded into the nut 23 to lock the hinge member 15 and filler member 16 together. This prevents removal of the hinge member 15 from the recess due to the locking action of the flange 19 within the undercut 18.

It is contemplated that changes and modifications may be made in the present invention without departing from the spirit or scope thereof.

What is claimed is:

1. In a spectacle frame front including a lens rim having a temporal portion, means defining a rearwardly opening recess in said temporal portion, said recess opening only into the rear face of the temporal portion of the lens rim and having a continuous peripheral wall, said temporal portion being undercut around a portion of the peripheral wall at one end of said recess, a hinge member having a flange thereon and received within said recess with said flange being seated in said undercut, a filler member complementary to said hinge member and disposed in said recess in abutment with said hinge member with a portion of the filler member overlapping a portion of said hinge member and the filler member abutting said peripheral wall at the opposite end of said recess, and means comprising a screw extending through and interconnecting the overlapping portions of said hinge and filler members for thereby retaining the hinge member firmly seated within the recess with the flange locked within said undercut.

References Cited

UNITED STATES PATENTS 2,504,749  4/1950  Stepacoff et al. ____ 351—153 X
3,102,156  8/1963  O'Dea _____ 351—153 X

FOREIGN PATENTS 1,128,173  4/1962  Germany.
1,335,996  7/1963  France.

DAVID H. RUBIN, Primary Examiner.